US012366047B2

(12) United States Patent
Widmann et al.

(10) Patent No.: US 12,366,047 B2
(45) Date of Patent: Jul. 22, 2025

(54) DRIVE DEVICE FOR A DIAPHRAGM WALL CUTTER

(71) Applicant: Liebherr-Components Biberach GmbH, Biberach an der Riss (DE)

(72) Inventors: Roland Widmann, Unlingen (DE); Johannes Halder, Ertingen (DE); Stefan Duelli, Eberhardzell (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 942 days.

(21) Appl. No.: 17/448,026

(22) Filed: Sep. 17, 2021

(65) Prior Publication Data

US 2022/0056661 A1 Feb. 24, 2022

Related U.S. Application Data

(63) Continuation of application No. PCT/EP2020/055789, filed on Mar. 5, 2020.

(30) Foreign Application Priority Data

Mar. 25, 2019 (DE) .................... 10 2019 107 588.2
May 7, 2019 (DE) .................... 10 2019 111 774.7

(51) Int. Cl.
*E02F 3/24* (2006.01)
*E02D 17/13* (2006.01)
*E02F 3/20* (2006.01)

(52) U.S. Cl.
CPC .............. *E02F 3/246* (2013.01); *E02D 17/13* (2013.01); *E02F 3/205* (2013.01)

(58) Field of Classification Search
CPC .. E02F 3/24; E02F 3/246; E02F 3/205; E02D 17/13
See application file for complete search history.

(56) References Cited

U.S. PATENT DOCUMENTS 2,519,075 A * 8/1950 Schmidt .................... E02F 3/10
254/326
2,826,837 A * 3/1958 Laue ........................ E02F 3/10
37/352

(Continued)

FOREIGN PATENT DOCUMENTS

AU 6468680 6/1981
AU 2805101 9/2001

(Continued)

OTHER PUBLICATIONS

Cao, Jian et al., "Structure Design and Performance Study of Swing Hydraulic Motor with Analogous Hydrostatic Bearing Technique", Hydraulics and Pneumatics, Issue 11, pp. 128-130, Nov. 15, 2014.

(Continued)

*Primary Examiner* — Christopher J Sebesta
*Assistant Examiner* — Audrey L Lusk
(74) *Attorney, Agent, or Firm* — Levine Bagade Han LLP

(57) ABSTRACT

The invention relates to a drive device for a diaphragm wall cutter, with a hydraulic motor, a gear unit, to which at least one cutting wheel of the diaphragm wall cutter can be connected on the output side, and a drive shaft which connects the hydraulic motor to the gear unit, wherein the drive shaft is mounted by way of at least one drive shaft bearing which is arranged between the hydraulic motor and the gear unit, wherein the drive shaft bearing has a lubricant feed line which is connected to a leakage discharge line of the hydraulic motor and/or to the hydraulic circuit in order to operate the hydraulic motor, and is configured to lubricate the drive shaft bearing with hydraulic oil.

18 Claims, 3 Drawing Sheets

(56) References Cited

U.S. PATENT DOCUMENTS

| | | | |
|---|---|---|---|
| 4,392,168 A | 7/1983 | Maruyama et al. | |
| 4,682,427 A * | 7/1987 | Dondi | E02F 3/964 |
| | | | 37/91 |
| 4,764,135 A | 8/1988 | McCormick | |
| 2006/0053665 A1 * | 3/2006 | Arzberger | E02D 17/13 |
| | | | 37/352 |
| 2018/0306306 A1 | 10/2018 | Hamada et al. | |

FOREIGN PATENT DOCUMENTS

| | | |
|---|---|---|
| BE | 849153 | 4/1977 |
| CA | 2431103 | 3/2004 |
| CA | 2466434 | 11/2005 |
| CH | 348295 | 8/1960 |
| CN | 102918211 | 2/2013 |
| CN | 105684276 | 6/2016 |
| DE | 102014213222 | 1/2016 |
| EP | 1637794 | 11/2015 |
| EP | 1666671 | 11/2015 |
| JP | 11-269913 | 10/1999 |
| JP | 2003-035398 | 2/2003 |
| JP | 2006-083694 | 3/2006 |
| JP | 2006-161550 | 6/2006 |
| JP | 2009-013598 | 1/2009 |
| JP | 2009013598 A * | 1/2009 |
| JP | 2012-045666 | 3/2012 |
| JP | 2014-510862 | 5/2014 |
| JP | 2014-237999 | 12/2014 |
| WO | WO 2018/108325 | 6/2018 |
| WO | WO 2020/193096 | 10/2020 |

OTHER PUBLICATIONS

Ning Dongdong et al., "Wind power yaw and pitch drive Design method of full complement needle roller bearing Law", Heavy Industrial & Hoisting Machinery, No. 03, Serial No. 31, pp. 26-29, 22, 2011.

Su, Hua et al., "Computational Fluid Dynamics Analysis of a Journal Bearing with Groove-texture Composite Structure", Lubrication and Sealing, vol. 42, No. 7, pp. 19-25, Jul. 15, 2017.

Wang, Zhi-wei, "Failure causes analysis and maintenance technology of main bearing lubrication system for tunnel boring machine", Construction Machinery, Issue 12, pp. 89-92, Dec. 9, 2015.

* cited by examiner

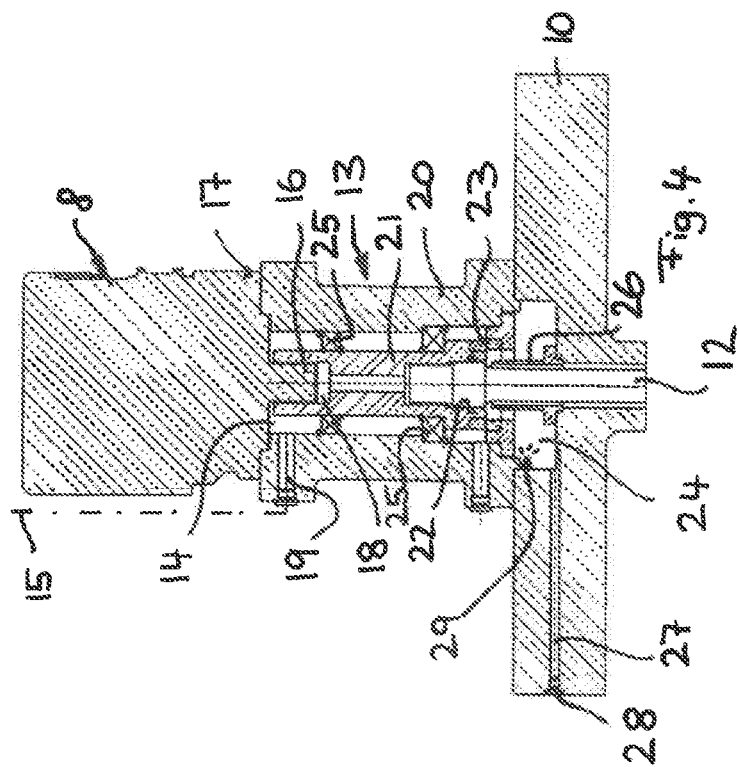
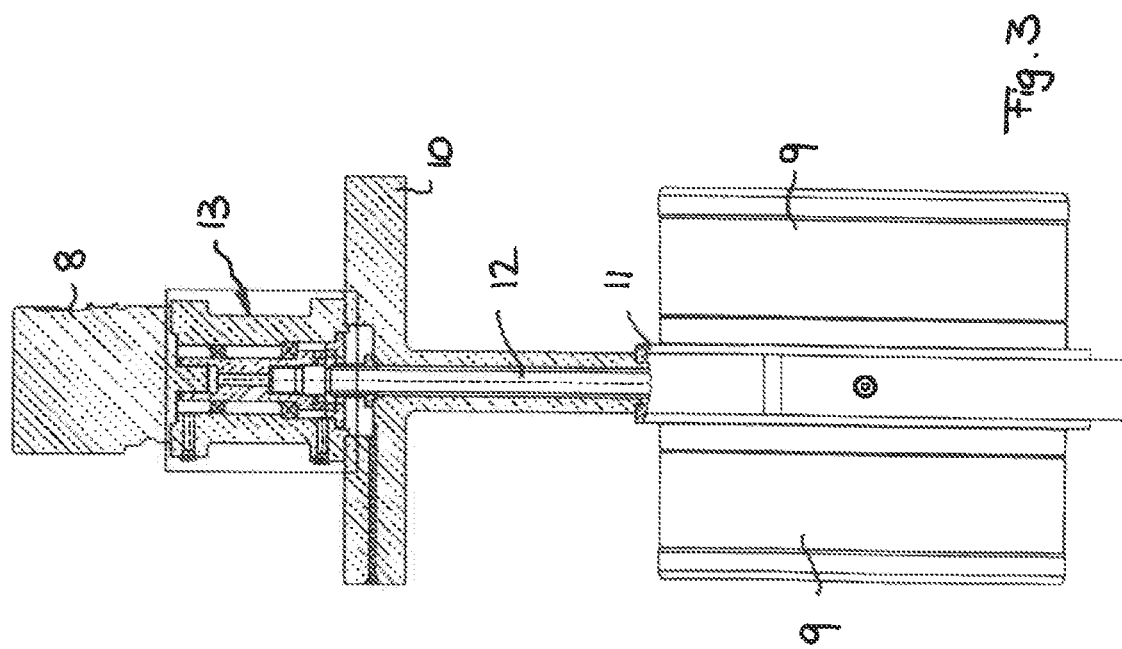

DRIVE DEVICE FOR A DIAPHRAGM WALL CUTTER

CROSS-REFERENCE TO RELATED APPLICATIONS

This application is a continuation of International Patent Application Number PCT/EP2020/055789 filed Mar. 5, 2020, which claims priority to German Patent Application Numbers DE 10 2019 107 588.2 filed Mar. 25, 2019 and DE 10 2019 111 774.7 filed May 7, 2019, all of which are incorporated herein by reference in their entireties.

BACKGROUND

The present invention relates to a drive device for a diaphragm wall cutter, with a hydraulic motor, a gear unit, to which at least one cutting wheel of the diaphragm wall cutter can be connected on the output side, and a drive shaft which connects the hydraulic motor to the gear unit, wherein the drive shaft is mounted by way of at least one drive shaft bearing which is arranged between the hydraulic motor and the gear unit. The invention also relates to a diaphragm wall cutter having such a drive device.

Diaphragm wall cutters are generally used in specialist civil engineering to cut trenches in the soil, rock or subsoil which are filled with a slurry containing, for example, concrete to form a diaphragm wall. Such diaphragm walls are generally wall constructions in the subsoil made of e.g. concrete, reinforced concrete and similar, in order to seal, support or generally insert impact on the subsoil in a certain way. When producing such a diaphragm wall, a diaphragm wall cutter is used to cut a substantially vertical, upwardly open trench, the cutter being lowered into the ground from above and guided by a basic machine supported on the ground, preferably a mobile machine, such as a crawler cable excavator. The diaphragm wall cutter usually comprises an elongated, upright cutter frame which is suspended from the basic machine so that it can be moved vertically and which usually carries several cutting wheels at its lower end which can be driven in opposite directions about respective horizontal axes. The drive for rotationally driving the cutting wheels may also be mounted on a lower portion of the cutter frame and may comprise, for example, one or more hydraulic motors capable of driving the cutting wheels via one or more gear stages.

The excavated soil material can be pumped to the surface with the help of an excavation pump, while the trench is constantly stabilized with a supporting suspension to prevent the trench or the diaphragm walls from collapsing. After reaching the required depth, the trench is then usually filled with concrete.

By placing the hydraulic motor away from the gear unit, which is achieved by said drive shaft, a compact design can be achieved. In particular, space problems at the support plate can be avoided if it is made narrow in the desired way. In particular, the hydraulic motor can be arranged above the support plate, which the cutting wheels are rotatably mounted on, so that the installation depth can be kept small in the area of the cutting wheels.

However, with such spacing and arrangement of the hydraulic motor, lubrication problems will occur. While the main components of the gear unit, in particular the planet gears thereof, sun gear and planet carrier can be lubricated in the area of the transmission housing with oil sump lubrication, the drive shaft bearing in particular, which supports the drive shaft between the hydraulic motor and the transmission, is located outside the transmission housing or no longer in the area of the oil sump and its splash range, so that lubrication of the drive shaft bearing can be challenging.

One approach to solving this problem is to use a permanently lubricated bearing for the drive shaft bearing. Another approach is to install a separate grease or oil lubrication system to supply grease and/or oil continuously or cyclically to the drive shaft bearing and the drive shaft connection to the motor shaft. However, both approaches involve increased maintenance work, since the permanently lubricated bearing and also the seals and nipples of a grease lubrication system have to be checked regularly and then also replaced. This increases the operating costs, while the effective operating time of the diaphragm wall cutter is reduced accordingly.

Furthermore, the document EP 16 37 794 B1 proposes to convey the gear oil located in the bottom trough of the gearbox upwards to the drive shaft bearing via the rotating drive shaft. For this purpose, the drive shaft is provided with a kind of feed thread, which is intended to feed the oil upwards in the manner of a worm shaft and thereby lubricate the drive shaft bearing and the gear teeth between the drive shaft and the motor shaft. However, this approach is not only disadvantageous in terms of the increased manufacturing costs for the drive shaft, but above all involves the problem that lubrication of the drive shaft bearing is only achieved if the drive shaft operates in the "correct" direction of rotation. If the direction of rotation is reversed, exactly the opposite is achieved and the oil is conveyed downwards. Apart from this, the transmission oil is only pumped upwards to the drive shafts when the transmission or the drive shaft starts to run, which leads to a short-term lack of lubrication of the drive shaft bearings, at least during start-up. Longer downtimes negatively affect the oil supply, as the oil settles to the bottom.

So proceeding from this, it is therefore the underlying object of the present invention to provide an improved drive device for a diaphragm wall cutter as well as an improved diaphragm wall cutter, which avoid the disadvantages of the prior art and further develop the latter in an advantageous manner. In particular, a permanent lubrication of the drive shaft bearing between hydraulic motor and gearbox is to be achieved without increased maintenance effort, which functions independently of the direction of rotation of the drive and shows no starting problems.

SUMMARY

Said task is solved, according to the invention, with a drive device as claimed in claim 1 and a diaphragm wall cutter as claimed in claim 17. Preferred embodiments of the invention are the subject-matter of the dependent claims.

It is therefore proposed that the drive shaft bearing not be lubricated, or at least not primarily lubricated, by the transmission oil, but that hydraulic oil be used for this purpose, with which the hydraulic motor is operated. According to the invention, the drive shaft bearing has a lubricant inlet that supplies leakage oil from the hydraulic motor and/or hydraulic oil from the hydraulic circuit to the drive shaft bearing for operating the hydraulic motor. Therefore, at least a portion of the hydraulic motor leakage oil and/or a portion of the hydraulic oil from the hydraulic circuit is passed through the drive shaft bearing to be lubricated and/or to other components of the drive train between the hydraulic motor and the transmission to be lubricated in order to lubricate the drive bearing and/or said other components.

In an advantageous further embodiment of the invention, in order to lubricate the drive shaft bearing and/or the connection between the drive shaft and the hydraulic motor, leakage from the hydraulic motor may be deliberately induced and/or increased, for example by omitting a shaft seal on the hydraulic motor and/or by passing a specially provided leakage bore through the motor housing and/or through the motor shaft in order to guide leakage oil to the drive shaft bearing and/or connection.

Said lubricant inlet of the drive shaft bearing may include a leakage collector and/or a leakage collection inlet that engages around and/or under the motor shaft of the hydraulic motor and/or the exit region where the motor shaft exits the motor housing of the hydraulic motor, such that leakage oil drips or splashes into said leakage collection inlet.

Such a leakage collecting inlet can be particularly advantageous if the hydraulic motor is arranged above the drive shaft and faces the drive shaft with its motor shaft pointing downwards. Said hydraulic motor may be arranged upside down, so to speak, and positioned upright above the drive shaft, wherein the motor shaft of the hydraulic motor may be arranged in particular coaxially with the drive shaft.

Alternatively, or in addition to a leakage feed, the lubricant feed of the drive shaft bearing may also comprise a fresh oil feed which may be connected to a section of the hydraulic circuit upstream of the hydraulic motor in order to use fresh hydraulic oil, which has not yet been hydraulically and/or thermally stressed or consumed by the work to be performed in the hydraulic motor, to lubricate the drive shaft bearing. Through such a fresh oil inlet, hydraulic oil can be tapped, so to speak, which in itself would have been intended to flow into the hydraulic motor in order to drive said hydraulic motor. While the leakage oil that comes out of the hydraulic motor after work is done is usually hot or thermally stressed, fresh oil that has been diverted from the hydraulic circuit upstream of the hydraulic motor is usually at a much cooler temperature. The hydraulic oil, which in itself is not designed to lubricate the drive shaft bearing, can produce a better lubricating film at cooler temperatures and consequently achieve better lubricating performance. In addition, the drive shaft bearing is cooled.

In further embodiments of the invention, the at least one drive shaft bearing may comprise a bearing sleeve or housing within which a coupling sleeve may be rotatably mounted, which coupling sleeve non-rotatably connects the drive shaft to the motor shaft of the hydraulic motor. Said coupling sleeve and/or drive shaft may be radially and/or axially supported on an inner circumferential surface of said bearing sleeve by pivot bearings, for example roller bearings and/or plain bearings, so that the housing and/or said bearing sleeve rotatably supports the coupling sleeve accommodated within and/or the drive shaft extending into the bearing sleeve.

At the same time, said bearing sleeve and/or said coupling sleeve may perform a lubricating function and/or form part of said lubricant supply through which hydraulic oil is supplied to lubricate the drive shaft bearing and/or the connection between the drive shaft and the motor shaft.

In particular, said coupling sleeve may be formed to be oil-tight towards the drive shaft so that an interior of the coupling sleeve forms an oil collection chamber and oil in the interior of the coupling sleeve cannot readily drain towards the drive shaft. Such a tight design of the coupling sleeve towards the drive shaft can be achieved, for example, by integrally molding the coupling sleeve in one piece, homogeneously in terms of material, onto the drive shaft.

However, in order to be able to detach the coupling sleeve from the drive shaft, which considerably simplifies assembly and maintenance, but on the other hand still achieve a sealing design, a seal can be provided between the coupling sleeve and the drive shaft in order to seal the interior of the coupling sleeve with respect to the drive shaft.

Advantageously, said coupling sleeve can cup-like embrace the motor shaft of the hydraulic motor emerging from the motor housing or the motor shaft stub, so that leakage oil emerging from the motor shaft stub runs into said coupling sleeve and is collected there, whereby the connection or the engagement surfaces between coupling sleeve and motor shaft or between coupling sleeve and drive shaft are lubricated.

In a further embodiment of the invention, a rotationally fixed connection between the coupling sleeve and the motor shaft and/or between the coupling sleeve and the drive shaft can be achieved by positive connecting means, for example a splined shaft profiling and/or a polygon profiling or a shaft-hub connection formed in another manner. Said lubricant inlet of the drive shaft bearing can supply hydraulic oil as lubricant to the engagement surfaces of said non-rotatable connecting means, in particular leakage oil from the hydraulic motor.

Alternatively, or in addition to using the coupling sleeve as a lubricant distributor, the aforementioned bearing sleeve in which the coupling sleeve is rotatably mounted can also serve as part of the lubricant supply to supply hydraulic oil to the lubricating elements. In particular, said bearing sleeve may have one end face connected to the motor housing of the hydraulic motor and/or embrace the motor shaft exiting therefrom.

Advantageously, said bearing sleeve can be sealed towards the coupling sleeve and/or towards the drive shaft by a rotary seal, so that an inner space of said bearing sleeve forms a collecting space for hydraulic oil and/or hydraulic oil supplied into the inner space of the bearing sleeve cannot easily run off towards the drive shaft.

Regardless thereof, said bearing sleeve may form an upright mounted component that does not rotate.

On the one hand, said bearing sleeve can collect leakage oil leaking from the motor shaft or leakage oil splashed by the motor shaft. Independently of this, however, said bearing sleeve can also serve to supply hydraulic oil or fresh oil branched off upstream of the hydraulic motor to the drive shaft bearing and/or the connecting elements between the drive shaft and the motor shaft.

In an advantageous further embodiment of the invention, the fresh oil inlet which can be connected to a section of the hydraulic circuit upstream of the hydraulic motor can lead into the interior of said bearing sleeve, in particular into the space between the bearing sleeve and the coupling sleeve. Advantageously, in this case, said fresh oil inlet can pass through a wall of said bearing sleeve so that the fresh oil can be supplied into the interior of the bearing sleeve through the bearing sleeve wall.

Said fresh oil inlet can in particular lead through an edge section of the bearing sleeve which is connected to the hydraulic motor, so that the fresh oil is led into the interior of the bearing sleeve very close to the hydraulic motor.

Advantageously, the leakage oil and/or the fresh oil branched off upstream of the hydraulic motor can be passed through substantially the entire length of the bearing sleeve and/or, after passing through the bearing sleeve, can be returned to the hydraulic circuit for operating the hydraulic motor.

In particular, said bearing sleeve may have a hydraulic oil outlet which may be arranged at an opposite end portion to said hydraulic oil inlet, in particular to said fresh oil inlet. If said fresh oil inlet is provided in the aforesaid manner at the edge portion of the bearing sleeve fixed to the hydraulic motor, the hydraulic oil outlet may be provided at an opposite edge portion of the bearing sleeve facing away from the hydraulic motor.

In particular, said bearing sleeve may have a fresh oil inlet at an upper sleeve portion and a hydraulic oil outlet at a lower bearing sleeve portion.

Advantageously, lubrication of the rolling bearings and/or plain bearings can be provided by said bearing sleeve, while lubrication of the gear teeth or engagement surfaces for transmitting the torque of the hydraulic motor to the drive shaft is advantageously provided by said coupling sleeve.

In a further embodiment of the invention, an oil collection chamber may be provided below the drive shaft bearing and/or below the non-rotational connection between the motor shaft and the drive shaft to collect hydraulic oil leaking through any leaks that have been used to lubricate the drive shaft bearing and/or the non-rotational connection. This makes it considerably easier to check for leaks, as the oil level in the aforementioned collecting chamber is an indicator of tightness.

Advantageously, an oil level sensor may be associated with said chamber to detect the oil level of the hydraulic oil collected in the collection chamber and to provide a corresponding oil level signal.

A closable drain can be assigned to said collecting chamber in order to be able to drain collected oil at regular intervals or also in order to be able to check whether oil escapes at all and arrives in said collection chamber. If no oil escapes from the collecting chamber when the outlet is opened, it can be concluded that there are no leaks.

Said collecting chamber can advantageously be sealed towards the gearbox or also be open. In order to prevent hydraulic oil from leaking into the transmission and accordingly mixing hydraulic oil and transmission oil, even in an open design, said collection chamber may have a riser tube through which the drive shaft may extend. Alternatively or additionally, however, said collecting chamber may be sealed with respect to the drive shaft and/or with respect to the gearbox by means of a seal.

BRIEF DESCRIPTION OF THE DRAWINGS

The invention is explained in more detail below on the basis of a preferred exemplary embodiment and the corresponding drawings. The drawings show:

FIG. 3: a longitudinal section through the drive device for driving the cutting wheels of the diaphragm wall cutter of the foregoing figures, showing the drive shaft between the cutting wheel transmission and the hydraulic motor and the drive shaft bearing between the hydraulic motor and the gearbox, as well as the rotationally fixed connection between the drive shaft and the hydraulic motor shaft, and FIG. 4: an enlarged longitudinal section through the drive shaft bearing and the non-rotating connection between the drive shaft and the motor shaft.

DETAILED DESCRIPTION

Figure 1:
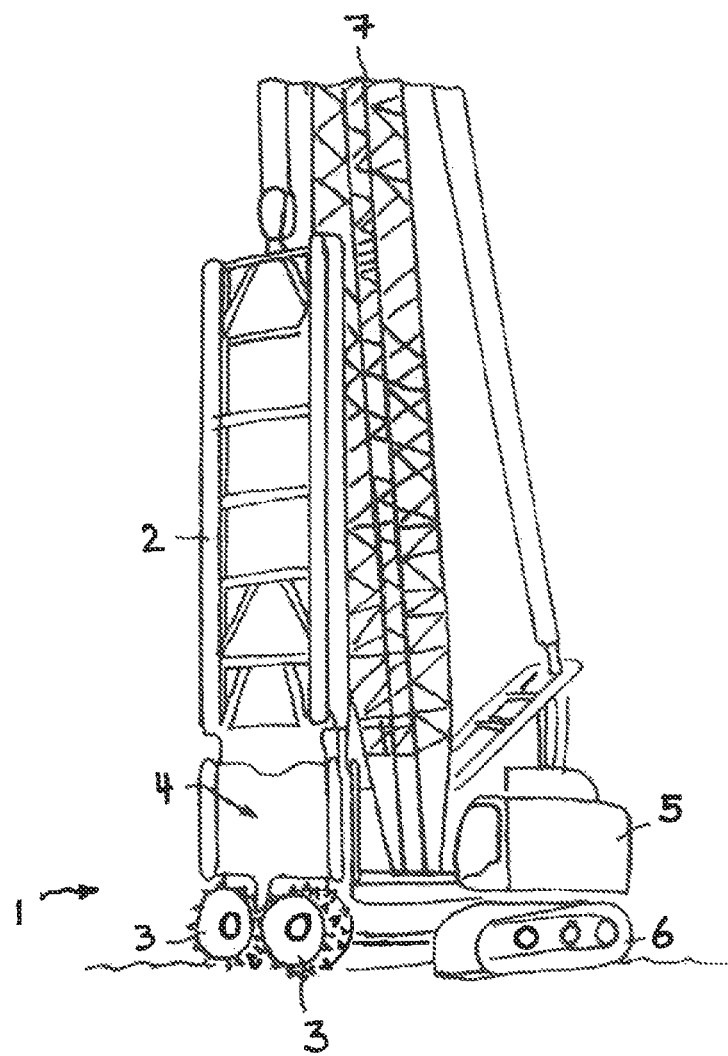
FIG. 1: a schematic, perspective view of a diaphragm wall cutter according to an advantageous embodiment of the invention.

As shown in FIG. 1, a diaphragm wall cutter 1 may have an elongated, upright cutter frame 2, which may be in the form of a beam and/or may comprise two laterally arranged longitudinal guide profiles. At a lower end portion, the cutter frame 2 may have at least two cutting wheels 3 which are arranged side by side and may be rotationally drivable about respective lying axes of rotation, wherein the axes of rotation of the cutting wheels 3 may extend parallel to each other and/or perpendicular to the flat side of the cutter frame 2.

The cutting wheels 3 can be driven in opposite directions to each other. A cutter drive 4 may be arranged at a lower end portion of the cutting section 2 above the cutting wheels 3 and may comprise one or more drive motors 8, for example in the form of hydraulic motors, which may drive said cutting wheels 3 via a gearbox or one or more gear stages 9.

As shown in FIG. 1, the cutter frame 2 with the cutting wheels 3 can be raised and lowered by, or suspended from, a basic machine 5. Said basic machine 5 rests on the ground in which the respective trench is to be cut, and may advantageously be movable. In particular, the basic machine 5 may be a cable excavator having a chassis, for example in the form of a tracked chassis 6, wherein the cutter frame 2 may be raised and lowered by an boom 7 of the basic machine 5.

Figure 2:
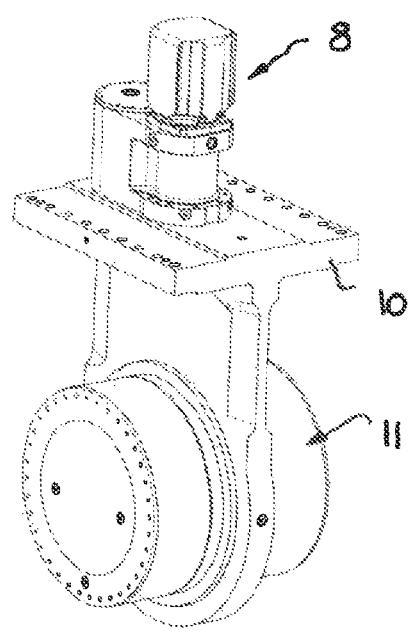
FIG. 2: A perspective view of the drive device for the cutting wheels of the diaphragm wall cutter of FIG. 1, wherein the drive motor is mounted on an upper section of a bearing plate and the gearbox housing, to which the cutting wheels of the diaphragm wall cutter of FIG. 1 are attached, is arranged in a lower section of the bearing plate.

As shown in FIGS. 2 to 4, the cutting wheel drive 4 may be arranged on, or comprise, a support plate 10 by means of which the drive device may be attachable to said cutter frame 2. For example, said support plates 10 can be a T-shaped support which can be fixed at its upper portion to the cutter frame 2 and can support at its lower portion a drive and/or gearbox housing 11 in which said gearbox stage 9 is at least partially housed.

The drive motor 8 may, for example, be attached to the upper end of the support plate 10 and drivingly coupled to the gear stage 9 via a drive shaft 12 which may extend inside the support plate 10. Said gear stage 9 may thereby comprise one or more planetary gear stages to drive one of said milling wheels 3.

As FIG. 3 shows, the two planetary gears 9 by which the cutting wheels 3 are driven may be drivingly connected by a substantially upright drive shaft 12 to the hydraulic motor 8, which may be located above the gears 9 on the support plate 10. Said hydraulic motor 8 may be arranged with its motor shaft stub 16 projecting downwardly from the motor housing 17, preferably coaxial with said drive shaft 12. The hydraulic motor 8 may be arranged with its motor shaft 16 vertical and positioned facing downward.

As FIG. 4 shows, the motor shaft 16 of the hydraulic motor 8 can be connected to the drive shaft 12 in a rotationally fixed manner by means of a coupling sleeve 21, it being possible for the said coupling sleeve 21 to be seated in a cup-like manner on the motor shaft 16 on the one hand and in a cup-like manner on the drive shaft 12 on the other hand. The non-rotational connection means between the coupling sleeve 21 and the motor shaft 16 or the coupling sleeve 21 and the drive shaft 12 may comprise, for example, a spline profiling, a splined profiling or a polygon profiling.

Said coupling sleeve 21 may thereby advantageously be rotatably supported by rolling bearings 25, alternatively or additionally by plain bearings, on a bearing sleeve 20 which may surround or receive said coupling sleeve 21. Said bearing sleeve 20 may be fixedly arranged, in particular mounted on the support plate 10 and connect to or support the hydraulic motor 8. In particular, the bearing sleeve 20 may engage around the motor shaft 16 and be connected or secured to the motor housing 17 of the hydraulic motor 8 at the end thereof to support the hydraulic motor 8. The end face of the bearing sleeve 20 may be secured to the support plate 10.

In order to lubricate the engagement surfaces between the coupling sleeve and the drive shaft 12, or the coupling sleeve 21 and the motor shaft 16, the interior of the coupling sleeve 21 may form part of a lubricant supply 14 to guide leakage oil escaping from the hydraulic motor 8 and/or fresh oil supplied separately to the interior of the bearing sleeve 20 to said engagement surfaces. In particular, the interior of the coupling sleeve 21 can form a leakage collection inlet 18 that can collect leakage oil leaking from the motor shaft 16 or the interface between the motor shaft 16 and the motor housing 17 and direct it to said engagement surfaces. In order to supply sufficient leakage oil to the upwardly open interior of the coupling sleeve 21, a shaft seal which would normally seal the motor shaft 16 against the motor housing 17 may be omitted on the hydraulic motor 8, so that by omitting the shaft seal leakage oil escapes at the outlet of the motor shaft 16 and enters the coupling sleeve 21, in particular at its upwardly open end which surrounds the motor shaft 16 in a cup-like manner.

To prevent accidental leakage of the leakage oil at the lower end of the coupling sleeve 21, a seal 22 may be provided at the lower end or end portion of the coupling sleeve 21 to seal the coupling sleeve 21 with respect to the drive shaft 12. Said seal 22 may thereby seal the gap provided circumferentially between the drive shaft 12 and the coupling sleeve 21, in particular in a shaft portion adjacent to the non-rotational profiling of the drive shaft 12 or located below this non-rotational connection portion.

In order to supply hydraulic oil not only to the lubrication points located inside the coupling sleeve 21, but also to the aforementioned rolling bearings 25 provided between the coupling sleeve 21 and the bearing sleeve 20, it is also possible, on the one hand, to make use of the aforementioned leakage oil escaping from the hydraulic motor 8, which may be splashed by the rotating motor shaft 16, in particular if the coupling sleeve 21 does not completely surround the motor shaft 16 as far as the motor housing 17.

Alternatively or in addition to the leakage oil mentioned, however, fresh oil can also be fed into the gap between the bearing sleeve 20 and the coupling sleeve 21, which is branched off upstream of the hydraulic motor 8 from the hydraulic circuit 15 by means of which the hydraulic motor 8 is driven.

Advantageously, the bearing sleeve 20 may have a fresh oil inlet 19 which may extend through the wall of the bearing sleeve 20 at the upper end of the bearing sleeve 20 immediately adjacent the motor housing 17, see FIG. 4. By supplying fresh oil at the upper end portion of the bearing sleeve 20 into the interior of the bearing sleeve 20, this fresh oil can run or drip or splash downwardly driven by gravity to lubricate the bearings 25.

Advantageously, a lower end portion of the bearing sleeve 20 may be sealed by a rotary seal 23 with respect to the drive shaft 12 and/or with respect to the coupling sleeve 21, so that the annular inner space between the bearing sleeve 20 and the coupling sleeve 21 or the drive shaft 12 is sealed downwardly to prevent hydraulic oil from running into the transmission 9 and mixing there with the transmission oil.

Said seal 22, in particular in the form of a rotary seal for sealing the bearing sleeve 20, may advantageously be arranged below all bearings 25.

As shown in FIG. 4, a collecting chamber 24 may advantageously be provided below the bearing and coupling sleeves 20 or 21, in particular also below the seal 22 and/or the rotary seal 23, which is formed around the drive shaft 12 or through which the drive shaft 12 passes. Said collecting chamber 24 may be formed, for example, in the support plate 10. Advantageously, a riser tube 26 may define the collecting chamber 24 and extend around or form an elevation at the drive shaft 12 to prevent hydraulic oil collected in the collection chamber 24 from running down the drive shaft 12 and into the transmission 9.

Said collection chamber 24 may have a drain 27, which may advantageously be provided with a releasable closure 28 to allow the drain 27 to be opened. Said drain 27 is preferably configured to allow hydraulic oil, which may be present in the collection chamber 24, to drain off in a gravity driven manner. For example, the drain 27 may be located at the bottom of the collection chamber 24 and may have a certain slope to allow oil to drain.

By opening the closure 28, it is possible to check whether there are any leaks at the seals 22 or 23 and whether there is oil in the collecting chamber 24.

Alternatively or additionally, the presence of oil in the collection chamber 24 can also be checked by an oil level sensor 29, by means of which the level in the collection chamber 24 can be sensed in order to output a corresponding oil level signal, for example to provide it to a machine control system. Based on the oil level in the collection chamber 24, a maintenance signal can be given or a maintenance process can be initiated.

We claim:

1. A drive device for a diaphragm wall cutter having at least one cutting wheel comprising:
   a hydraulic motor;
   a gear unit configured to connect on the output side to at least one cutting wheel of the diaphragm wall cutter;
   a motor shaft; and
   a drive shaft connecting the hydraulic motor to the gear unit, wherein the drive shaft is mounted by a drive shaft bearing which is between the hydraulic motor and the gear unit, wherein the drive shaft bearing has a lubricant feed line connected to a leakage discharge line of the hydraulic motor, wherein the lubricant feed line is configured to lubricate the drive shaft bearing with lubricant,
   wherein the lubricant feed line has a leakage collecting inlet for lubricating the drive shaft, wherein the leakage collecting inlet is connected to the hydraulic motor and is configured to be fed by oil leakage from the hydraulic motor, wherein the leakage collecting inlet engages around and/or under the motor shaft and/or the outlet of the motor shaft, and
   wherein the hydraulic motor is formed free of shaft seals at the outlet of the motor shaft from a motor housing so that the oil leakage from the hydraulic motor lubricates the drive shaft bearing via the leakage collecting inlet.

2. The drive device of claim 1, wherein the hydraulic motor is above the drive shaft and faces the drive shaft with the motor shaft of the hydraulic motor pointing downward and aligned coaxially with the drive shaft while standing upright overhead.

3. The drive device of claim 1, wherein the lubricant feed line comprises a fresh oil inlet connected to a portion of the hydraulic circuit upstream of the hydraulic motor and adapted to lubricate the drive shaft bearing with fresh hydraulic oil.

4. The drive device of claim 1, wherein the drive shaft bearing comprises a bearing sleeve, within which a coupling sleeve is rotatably mounted, wherein the coupling sleeve connects the drive shaft to the motor shaft in a rotationally fixed manner.

5. The drive device of claim 4, further comprising a seal for sealing the coupling sleeve with respect to the drive shaft and/or the coupling sleeve is connected to the drive shaft in an oil-tight manner, so that the coupling sleeve forms a collecting chamber for hydraulic oil.

6. The drive device of claim 5, wherein the bearing sleeve is connected with one end face to the motor housing of the hydraulic motor and/or embraces the motor shaft of the hydraulic motor emerging therefrom.

7. The drive device of claim 4, wherein the bearing sleeve is connected with one end face to the motor housing of the hydraulic motor and/or embraces the motor shaft of the hydraulic motor emerging therefrom.

8. The drive device of claim 1, wherein a fresh oil inlet leads into the interior of a bearing sleeve and passes through a wall of the bearing sleeve.

9. The drive device of claim 1, further comprising a rotary seal, wherein the rotary seal seals off a bearing sleeve from the coupling sleeve and/or from the drive shaft so that an interior space of the bearing sleeve forms a collecting space for hydraulic oil.

10. The drive device of claim 1, wherein a bearing sleeve has a hydraulic oil inlet and a hydraulic oil outlet at opposite end portions, wherein the hydraulic oil inlet and hydraulic oil outlet are configured so hydraulic oil can be flushed through the bearing sleeve and through the hydraulic oil inlet and hydraulic oil outlet.

11. The drive device of claim 1, further comprising a return for the hydraulic oil passing through the drive shaft bearing into the hydraulic circuit for operating the hydraulic motor.

12. The drive device of claim 1, wherein a bearing sleeve forms a hydraulic oil reservoir for lubricating rolling bearings and/or plain bearings by which the drive shaft and/or a coupling sleeve are rotatably supported.

13. The drive device of claim 1, further comprising non-rotatable connectors, wherein a coupling sleeve forms a hydraulic oil collecting chamber for lubricating the non-rotatable connectors by which the drive shaft is non-rotatably connected to the motor shaft of the hydraulic motor.

14. The drive device of claim 1, wherein a collecting chamber for collecting hydraulic oil is below a bearing sleeve and/or a coupling sleeve.

15. The drive device of claim 14, wherein an oil level sensor for detecting the oil level in a collection chamber is associated with the collection chamber.

16. The drive device of claim 15, further comprising a drain for draining oil collected in the collection space, wherein the drain is associated with the collection space, and wherein the drain comprising a releasable closure.

17. The drive device of claim 14, further comprising a drain for draining oil collected in the collection space, wherein the drain is associated with the collection space, and wherein the drain comprising a releasable closure.

18. A diaphragm wall cutter comprising the drive device of claim 1.

* * * * *